(12) United States Patent
Beckerman et al.

(10) Patent No.: US 11,459,144 B2
(45) Date of Patent: Oct. 4, 2022

(54) CONTAINER FOR DISTILLED SPIRITS AND METHOD FOR MAKING THE SAME

(71) Applicant: Stillhouse Spirits Co., Los Angeles, CA (US)

(72) Inventors: Brad Beckerman, Encino, CA (US); Steve Sandstrom, Portland, OR (US); Zhao Shao Feng, Guangdong (CN)

(73) Assignee: AMERICANA JV INVESTMENTS INC., Coral Gables, FL (US)

( * ) Notice: Subject to any disclaimer, the term of this patent is extended or adjusted under 35 U.S.C. 154(b) by 0 days.

(21) Appl. No.: 15/622,726

(22) Filed: Jun. 14, 2017

(65) Prior Publication Data

US 2017/0355486 A1 Dec. 14, 2017

Related U.S. Application Data

(60) Provisional application No. 62/349,962, filed on Jun. 14, 2016.

(51) Int. Cl.
| | |
|---|---|
| B65D 6/32 | (2006.01) |
| B65D 41/04 | (2006.01) |
| B65D 6/02 | (2006.01) |
| B65D 85/72 | (2006.01) |
| B23K 35/38 | (2006.01) |
| B23K 11/00 | (2006.01) |
| B65D 6/40 | (2006.01) |
| B23K 11/093 | (2006.01) |
| B23K 101/12 | (2006.01) |
| B23K 103/04 | (2006.01) |

(52) U.S. Cl.
CPC .............. B65D 7/38 (2013.01); B23K 11/002 (2013.01); B23K 11/0006 (2013.01); B23K 11/093 (2013.01); B23K 35/383 (2013.01); B65D 7/06 (2013.01); B65D 7/40 (2013.01); B65D 41/04 (2013.01); B65D 85/72 (2013.01); B23K 2101/12 (2018.08); B23K 2101/125 (2018.08); B23K 2103/05 (2018.08)

(58) Field of Classification Search
CPC ... B65D 7/06; B65D 7/38; B65D 7/40; B65D 41/04; B65D 85/72; B23K 11/006; B23K 11/383
USPC ..... 219/117.1, 118, 119, 136, 137, 137 WM, 219/137.2; 413/1, 2, 4, 5, 7
See application file for complete search history.

(56) References Cited

U.S. PATENT DOCUMENTS

| | | | | |
|---|---|---|---|---|
| 3,523,513 | A * | 8/1970 | Maier | B21D 51/2676 413/69 |
| 4,043,482 | A * | 8/1977 | Brown | B65D 1/48 220/783 |
| 4,283,617 | A * | 8/1981 | Merrick | B23K 9/0286 219/125.1 |

(Continued)

FOREIGN PATENT DOCUMENTS

TW 200836983 A * 9/2008 ............... B65D 8/00

*Primary Examiner* — Justin C Dodson
(74) *Attorney, Agent, or Firm* — Amster, Rothstein & Ebenstein LLP (57) ABSTRACT

A container for distilled spirits includes a stainless steel body, stainless steel top element and stainless steel bottom element wherein the body, top element and body element are joined together without solder such that the flavor of the distilled spirits therein is preserved. A method of making the container is also disclosed.

6 Claims, 6 Drawing Sheets

(56) References Cited

U.S. PATENT DOCUMENTS

| | | | | |
|---|---|---|---|---|
| 4,507,540 | A | * | 3/1985 | Hamasaki .......... B23K 26/1429 |
| | | | | 219/121.64 |
| 4,734,556 | A | * | 3/1988 | Namiki ................ B23K 11/252 |
| | | | | 219/110 |
| 5,232,117 | A | * | 8/1993 | Hale ...................... B65D 7/045 |
| | | | | 220/495.08 |
| 5,465,863 | A | * | 11/1995 | Seick ..................... B65D 7/045 |
| | | | | 220/495.01 |
| 5,866,866 | A | * | 2/1999 | Shimada .............. B23K 11/257 |
| | | | | 219/110 |
| 2003/0113416 | A1 | * | 6/2003 | Wycliffe .................. B65D 7/38 |
| | | | | 426/131 |
| 2009/0120828 | A1 | * | 5/2009 | Sanfilippo ................ B65B 1/02 |
| | | | | 206/508 |
| 2012/0181256 | A1 | * | 7/2012 | Rotheut .................. B23K 11/11 |
| | | | | 219/117.1 |
| 2013/0233839 | A1 | * | 9/2013 | Barhorst ................ B23K 35/36 |
| | | | | 219/137 WM |
| 2014/0263150 | A1 | * | 9/2014 | Robinson .............. B21D 51/38 |
| | | | | 215/44 |
| 2015/0158657 | A1 | * | 6/2015 | Olson ................ B65D 81/3841 |
| | | | | 220/592.27 |

* cited by examiner

CONTAINER FOR DISTILLED SPIRITS AND METHOD FOR MAKING THE SAME

CROSS-REFERENCE TO RELATED APPLICATION

The present application claims benefit of and priority to U.S. Provisional Patent Application Ser. No. 62/349,962 entitled CONTAINER FOR DISTILLED SPIRITS AND METHOD FOR MAKING THE SAME filed Jun. 14, 2016, the entire content of which is hereby incorporated by reference herein.

BACKGROUND

Field of the Disclosure

The present disclosure relates to a container for holding distilled spirits and a method for making the same. In particular, the container is formed from a sheet of stainless steel that is welded using an electric resistance welding technique in a manner that avoids the use of solder and will not damage the container or affect the taste or color of the spirits stored within the container.

Related Art

Conventional containers for spirits, particularly those with higher alcohol content like whiskey, are commonly made of glass which is generally non-reactive with alcohol such that the taste of the spirits is not affected even if stored for an extended period. In general, metal containers are not appropriate for such spirits since storage in a metal container can result in the alcohol reacting with the metal which changes the taste of the sprits. Further, in many cases, metal containers include one or more welded seams, which use solder that also negatively affects the taste of the alcohol. In addition, the use of metal and/or solder can also affect the color of the spirits stored in the container which is also undesirable.

Accordingly it would be beneficial to provide a metal container for alcoholic spirits that avoids these and other problems.

SUMMARY

It is an object of the present disclosure to provide a container to hold distilled spirits that does not affect the taste of the sprits. Preferably, the container includes a sheet of stainless steel with its ends welded together, without solder and with a top and a bottom connected thereto, also without the use of solder.

A container for distilled spirits in accordance with an embodiment of the present application includes a stainless steel body, a stainless steel top portion connected to a top edge of the stainless steel body, a stainless steel bottom portion connected a bottom edge of the stainless steel body; and a cavity defined by the stainless steel top portion, the stainless steel bottom portion and the stainless steel body in which the distilled spirits are stored, wherein the stainless steel body, stainless steel top portion and stainless steel bottom portion are joined together to seal the distilled spirits in the container without the use of solder.

A method of making a container for distilled spirits in accordance with an embodiment of the present disclosure includes providing a rectangular stainless steel sheet, joining opposite longitudinal ends of the stainless steel sheet together, welding the opposite longitudinal ends of the stainless steel sheet together without the use of solder, attaching a stainless steel top element to a top edge of the stainless steel sheet and attaching a stainless steel bottom element to a bottom edge of the stainless steel sheet such that the stainless steel sheet, stainless steel top element and stainless steel bottom element define a cavity for storage of the distilled spirits.

BRIEF DESCRIPTION OF THE DRAWINGS

These and other features, advantages and benefits of the present disclosure will become apparent from the following description of the disclosure which refers to the accompanying drawings, wherein like reference numerals refer to like features across the several views, and wherein.

DETAILED DESCRIPTION OF THE EMBODIMENTS

Figure 1:
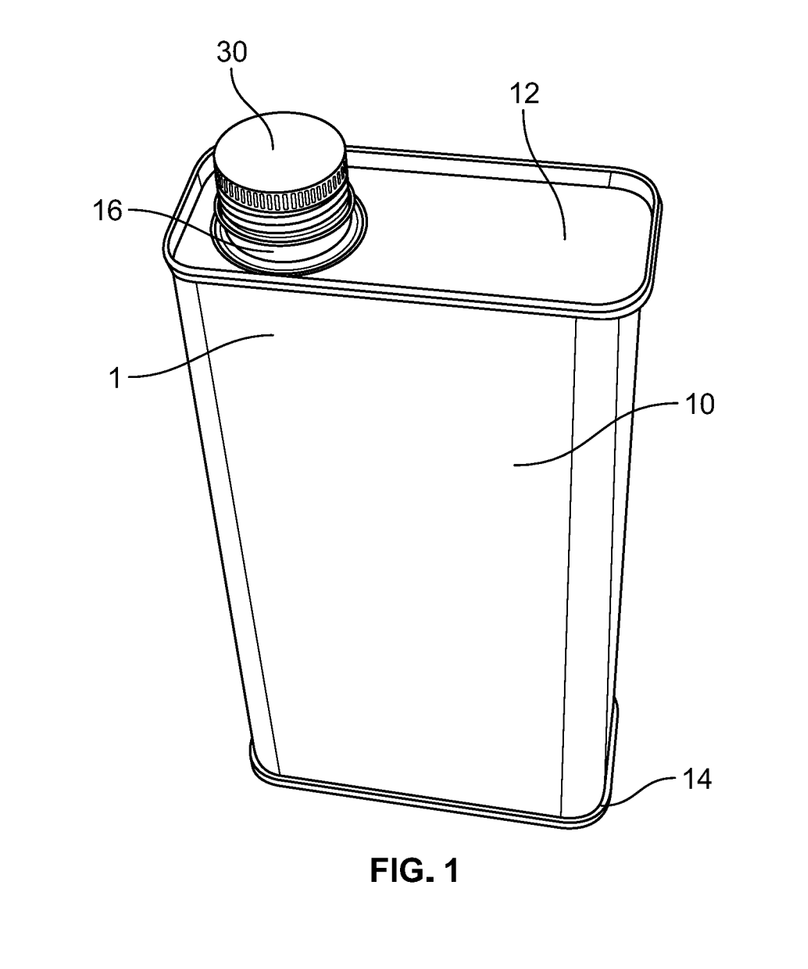
FIG. 1 illustrates an exemplary container in accordance with an embodiment of the present invention.

FIG. 1 illustrates an exemplary embodiment of a container 1 for holding alcoholic spirits in accordance with an embodiment of the present disclosure. The container 1 preferably includes a body 10 with a top element 12 and a bottom element 14 attached to the top and bottom thereof, respectively. The alcoholic spirit is stored in cavity or space in the interior of the body 10 formed by the body 10, the top element 12 and the bottom element 14. In a preferred embodiment, the top element 12 includes a spout 16 that extends from an opening 12A (see FIG. 6) in the top element 12. In use, the alcoholic spirit is poured out of the container 1 through this spout 16. While a spout 16 is illustrated, any suitable structure to remove alcohol from the container 1 may be used, including but not limited to simply providing the opening 12A in the top element 12 of the container 1 without a spout. In an embodiment, the top element 12 may be substantially the same as the bottom element 14 and the user may provide an opening in the top element 12 (or bottom element 14) in order poor alcohol from the container 1.

Figure 2:
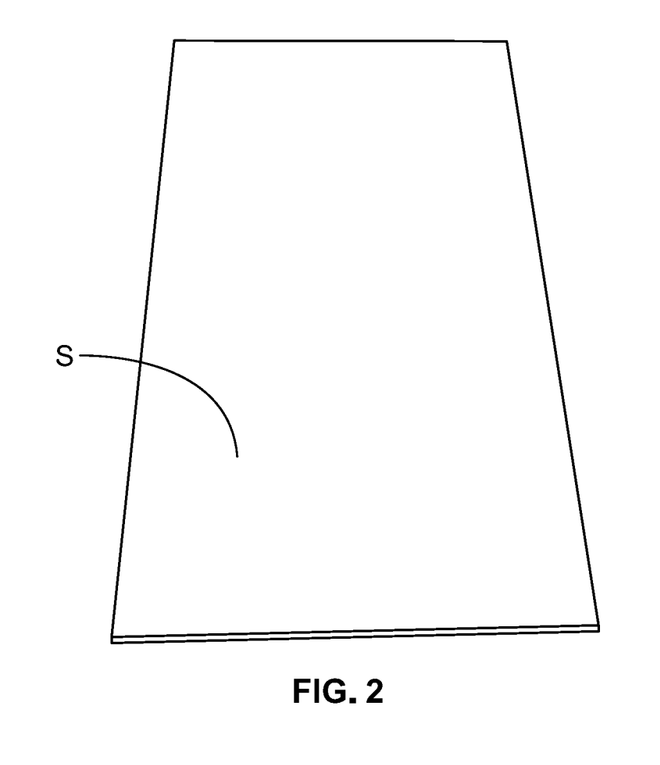
FIG. 2 illustrates an exemplary sheet of stainless steel used to make the container of FIG. 1.

In a preferred embodiment, the body 10 is formed from a single sheet of stainless steel S. FIG. 2 illustrates an exemplary stainless steel sheet S. As illustrated, the stainless steel sheet S may include printing or indicia that will face outward on the container 1. In addition, if desired, certain printing or indicia may be embossed on the stainless steel sheet S. As illustrated in FIG. 2, the stainless steel sheet S is preferably substantially rectangular in shape. The use of stainless steel for the body 10 is preferred because stainless steel will not react with the alcohol in the alcoholic sprits such that the proper taste and color of the spirits will be preserved. The dimensions of the stainless steel sheet S are exemplary and are suitable for making a container 1 suitable for holding 750 mL of alcoholic spirits, however, the container 1 may be made for holding other amounts of fluid, as desired. In this case, the dimensions of the steel sheet 1 will vary upward and downward based on the desired volume of the container 1. The use of a single stainless steel sheet is preferred as it simplifies construction and minimizes welding in the container 1. In an embodiment, however, the stainless steel sheet S may include two or more stainless steel sheets connected together to form a rectangular shape, provided that this connection is made without the use of solder or any other potential contaminant.

Figure 3A:
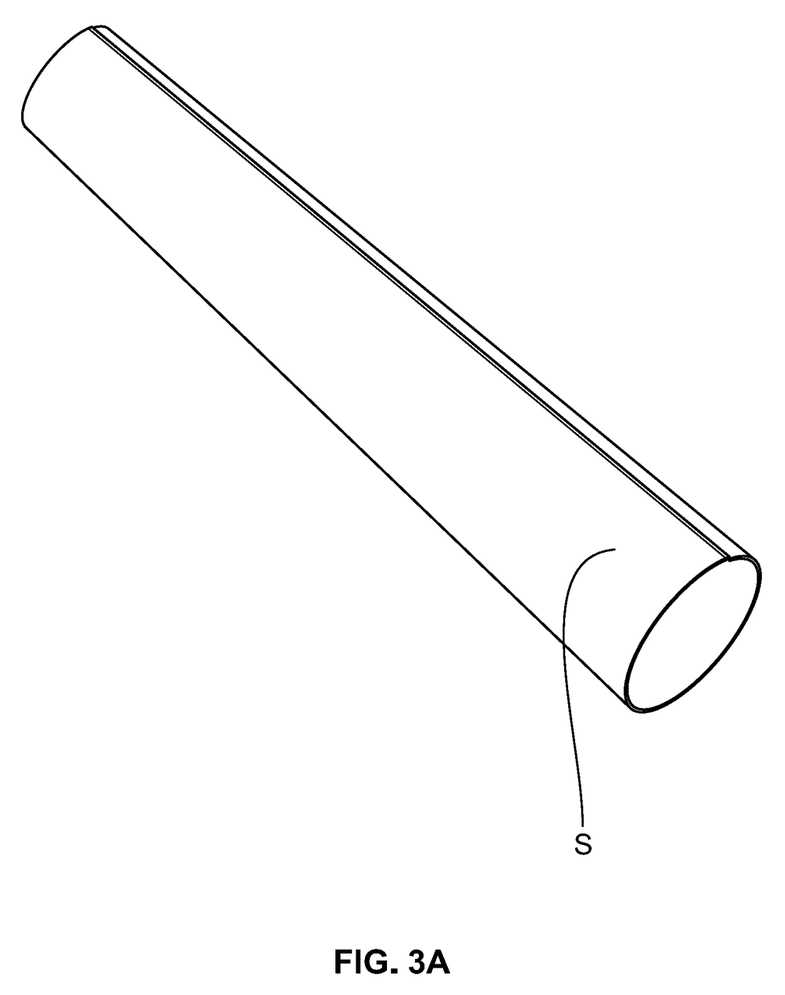
FIG. 3A illustrates the sheet of stainless steel of FIG. 2 with opposing longitudinal ends joined together to form a body of the container of FIG. 1.
Figure 3B:
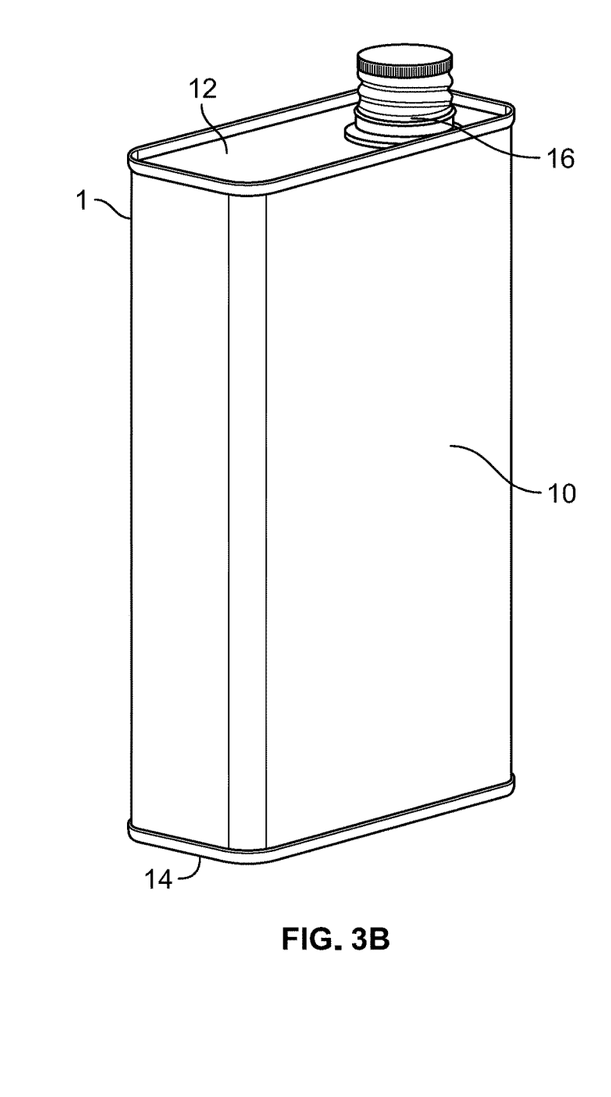
FIG. 3B is a more detailed view of the welded seam on the body of the container of FIG. 1.

FIG. 3A illustrates a stainless steel sheet S rolled such that the opposite edges thereof are in contact with each other. In FIG. 3A, the sheet S has been folded or rolled into a generally cylindrical shape and. In a preferred embodiment, the two longitudinal edges of the sheet S are welded together using an electric resistance welding technique to provide the body 10 of the container 1. In particular, in a preferred embodiment, the electric resistance welding technique includes an additional DC frequency conversion technique in which the voltage changes from 380V to 36V while maintaining the same current of 12 kvA. Frequency will increase from 50 Hz to 500 Hz so that less power is consumed per weld when compared to conventional electric resistance welding. In addition, using this technique prevents overheating of the material while the use of a higher frequency ensures a continuous weld along the entire seam. Electric resistance welding also eliminates the need for solder in the weld, which is preferred, since, as noted above, solder can affect the taste and/or color of alcoholic beverages that may be stored in the container 1. FIG. 3B illustrates the clean and continuous weld provided on the container 1 using the electric resistance welding technique discussed above. In addition, during the weld, nitrogen is released along the welding surface. The nitrogen prevents oxidation on the surface and also helps to reduce temperature to prevent damage to the stainless steel. Preventing overheating is particularly useful where the steel sheet S includes indicia or other decoration. Since the welding process uses no solder and provides for a constant weld without overheating or oxidation, the steel body 10 is securely connected without danger of contaminating or altering the taste of the alcoholic spirits that will be stored in the container 1. The body 10 may be welded using any suitable welding machine that allows for electric resistance welding using the parameters discussed above and that provides for nitrogen flow over the welding area to prevent oxidation.

Figure 4:
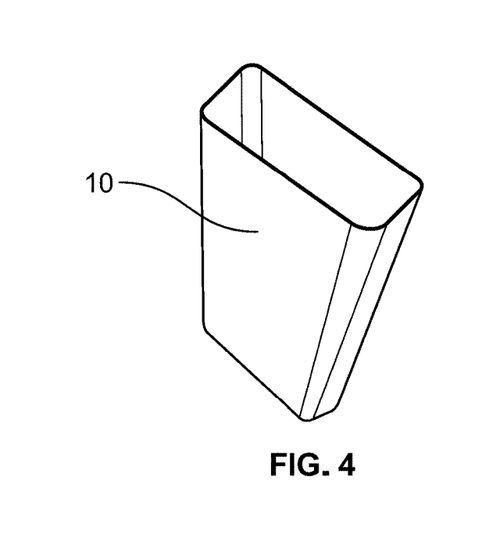
FIG. 4 illustrates the rolled and joined sheet of stainless steel of FIG. 3A formed into a rectangular shape.

FIG. 4 illustrates the steel sheet S after it has been welded and shaped to form the body 10. As illustrated in FIG. 3A, the sheet S is wrapped into a cylindrical shape and the opposite ends thereof are welded together. FIG. 4 illustrates the sheet S formed into the rectangular shape of the body 10 of the container 1 after it is welded. Shaping may be accomplished by putting the cylindrical sheet S on a forming device which imparts the rectangular shape. Any other suitable forming process may be used, as desired. Further, the body 10 and container 1 of the present disclosure are not limited in shape to a rectangular shape and may take other shapes, if desired.

Figure 5:
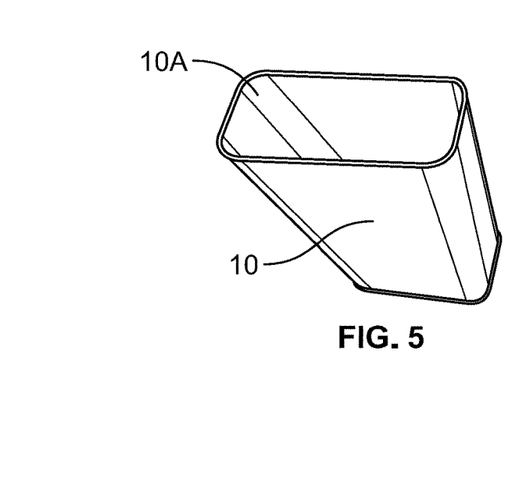
FIG. 5 illustrates the shaped body of FIG. 4 with the top edge thereof curled.

FIG. 5 illustrates body element 10 of the container 1. The top edge 10A is preferably folded or rolled downward and outward as can be seen in FIG. 5. The bottom edge (not shown) of the body 10 is also preferably similarly folded or rolled upward and outward as well. This activity may be performed using a hydraulic roll edge device or any other suitable device. These folded or rolled edges allow for a better fit between the top element 12, the bottom element 14 and the body 10, preventing leaks from the container 1. The top element 12 and bottom element 14 are both connected to the body 12 such that air does not leak into the container 1 and fluid does not leak out of the container 1.

Figure 6:
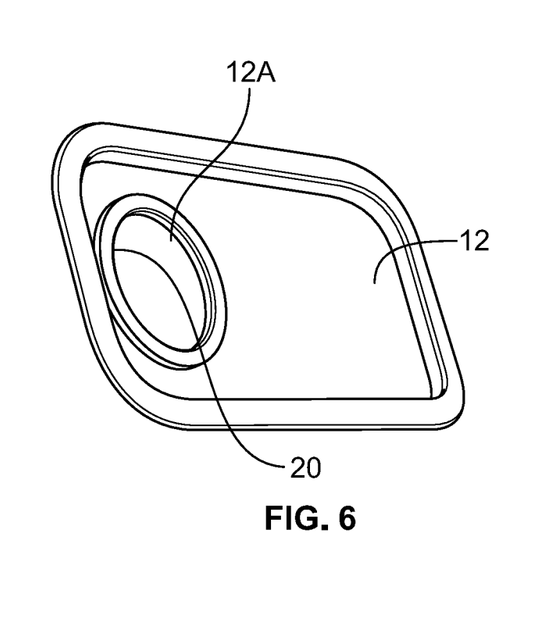
FIG. 6 illustrates a top element of the container of FIG. 1 prior to being installed on the body.
Figure 7:
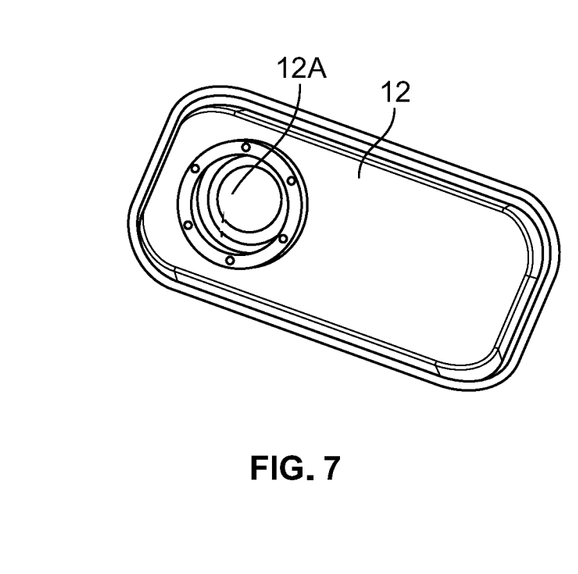
FIG. 7 illustrates the addition of a spout element to the top element.

As noted above, the top element 12 preferably includes an opening 12A formed therein. In an embodiment, a sealing gasket 20 is placed around the edge of the opening 12A. After the gasket 20 is installed, the spout 16 is inserted into the opening 12A and forms a seal with the gasket 20. FIG. 6 illustrates insertion of the gasket 20 into the opening 12A with the gasket 20 already in place. FIG. 7 illustrates the spout 16 inserted into the opening 12A. In an embodiment, the spout 16 may be secured to the top element 12 via a punch-press, however any suitable connection may be used. The gasket 20 prevents leakage of spirits between the spout 16 and the top element 12. The top element 12 is preferably also made of stainless steel.

Figure 8:
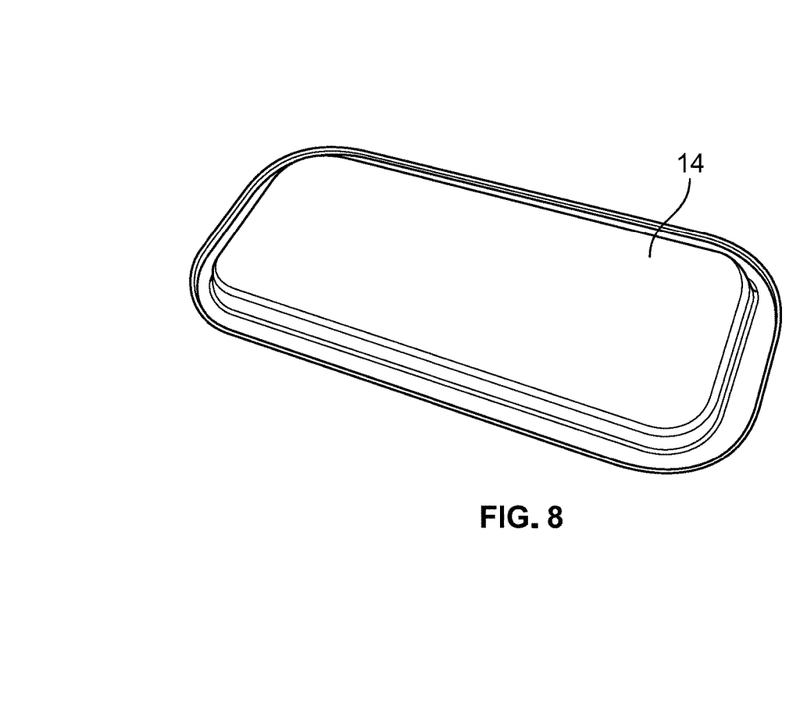
FIG. 8 illustrates a bottom element of the container of FIG. 1 before attachment to the body.
Figure 9:
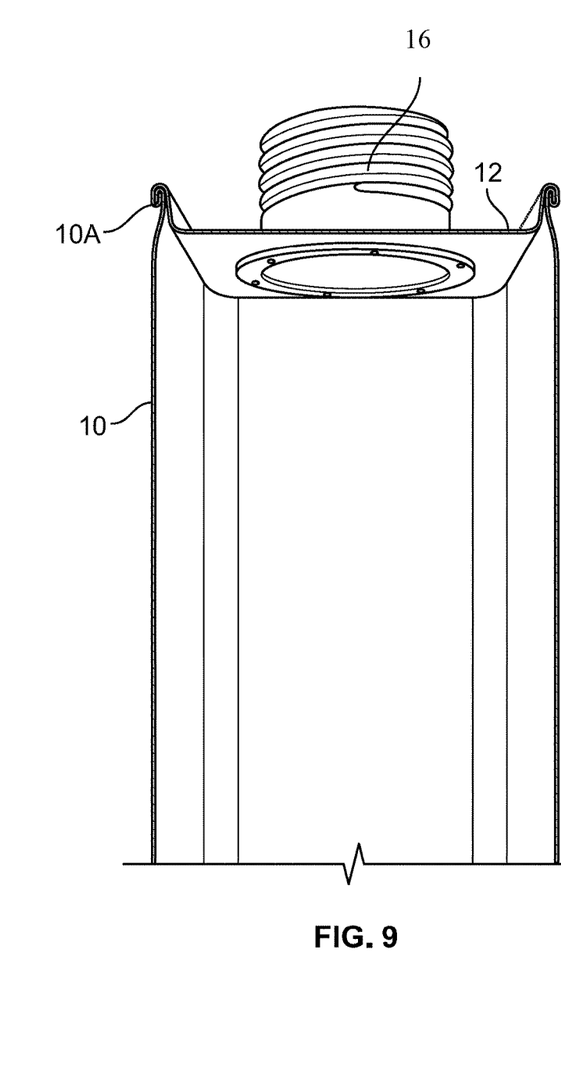
FIG. 9 illustrates the container of FIG. 1 with a cross sectional cut therein to show the connection between the top element and the body.

FIG. 8 illustrates a set of bottom element 14 suitable for connection to the body 10. The bottom element 14 is preferably glued to the body 10 using a food-grade adhesive, however, any suitable connection may be used, provided that it does not affect the taste of the spirits. The bottom element 14 is preferably made of stainless steel. The top element 12 is similarly preferably attached to the top of the body 10 using a food-grade adhesive. The rolled edges of the top and bottom of the body 10 provide for a secure seal between the top element 12 and the body 10 and the bottom element 14 and the body element 10, respectively. FIG. 9 illustrates a cross sectional view of the top portion of the container 1 illustrating the effectiveness of the mating between the tope element 12 and the rolled top edge of body 10 in forming a seal.

After the top element 12 and bottom element 14 are connected to the body 10, the container 1 may be cleaned using pressurized air, for example, or using any other suitable method. Thereafter, it is preferred that the container 1 be tested to ensure there are no leaks. In an embodiment, the container 1 is tested in a high pressure testing machine which forces air into the container 1 at high pressure to determine if there are any leaks in the container 1. While a high pressure air testing machine is discussed, any suitable testing may be performed. Following this testing, and presuming the container passes, a hand inspection may be performed. In a preferred embodiment, a final heating step is provided at about 200 degrees F. which dries the container and brings out a shiny finish. The container 1 may also include a cap 30 (see FIG. 1, for example) that screws onto the spout 16 to keep the contents of the container secure. While the spout 16 is illustrated with an external thread such that the cap 30 can be screwed onto the spout 16, the cap may be secured in any desired fashion such that the spout need not include an external thread.

The container 1 described above is ideal for storing alcoholic sprits since it preserves the original flavor and color of the spirits while providing a durable and protective container. The use of stainless steel throughout the container, and the elimination of any need for solder, prevents unwanted reactions between the container and the spirits stored therein.

Figure 10:
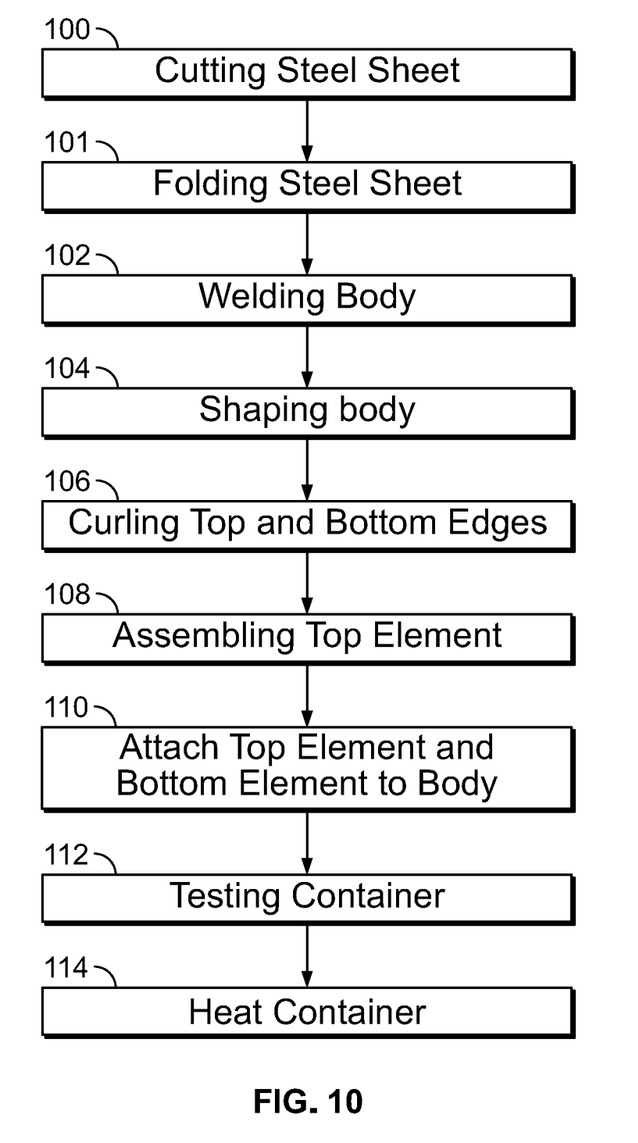
FIG. 10 illustrates an exemplary flow chart of a method of making a container in accordance with an embodiment of the present disclosure.

A method of making the container 1 described above is further explained with reference to the exemplary flow chart of FIG. 10. In step 100, the stainless steel sheet S is cut into the desired rectangular shape. Alternatively, a stainless steel sheet may be precut or preformed in the desired rectangular shape, in which case this cutting step may be unnecessary. In step 101, the stainless steel sheet S is folded or rolled such that the longitudinal ends thereof meet. Thereafter, in step 102, the ends of the stainless steel sheet S are welded together to form the body 10. As described above, in a preferred embodiment, the welding step 102 preferably includes an electric resistance welding process that includes an additional DC component. In addition, as noted above, the welding step preferably includes supplying nitrogen to the welding surface to prevent oxidation and reduce temperature. Thereafter, in step 104, the cylindrical body is formed into a desired shape, such as the rectangular shape of the container 1 of FIG. 1. In an embodiment, the desired shape could be a cylindrical shape, in which case the shaping of step 104 may be unnecessary. In step 106, the top and bottom edges of the body are curled outward as described above. In step 108, the spout 16 is attached to the top element of the container 1. As noted above, this step may include installation of the gasket 20 into the opening 12A as well as fitting the spout onto the top element 12. Alternatively, the top element may be pre-formed to include the spout or may not include a spout at all such that this step may be unnecessary. In step 110, the top and bottom elements 12, 14 are mounted on the body 10 as noted above. This step may include using an adhesive and may include passing the body with the top and bottom element through a sealing machine or device to ensure a seal with the adhesive. In an embodiment, a testing step 112 may follow in which the container 1 is checked for leaks. If it passes, the container 1 may be heated to 200 degrees F. at step 114 to dry the container and make its finish shiny. While the testing and heating steps above are preferred to ensure quality, they are not necessary. If the container 1 does not pass the testing step, that is, if it leaks, the container may be discarded or recycled. In addition, the method of FIG. 10 may include an optional step of painting or otherwise decorating the steel sheet S prior to cutting or folding it. In addition, an optional embossing step may take place prior to the cutting or folding steps, if desired.

Although the present disclosure has been described in relation to particular embodiments thereof, many other variations and modifications and other uses will be apparent to those skilled in the art. It is preferred, therefore, that the present invention not be limited the specific disclosure herein, but only by the appended claims.

What is claimed is:

1. A method of making a container for distilled spirits consisting of:
    providing a rectangular stainless steel sheet;
    joining opposite longitudinal ends of the rectangular stainless steel sheet together;
    welding the opposite longitudinal ends of the rectangular stainless steel sheet together, wherein the welding step includes a conversion from a first voltage to a second, lower voltage while maintaining a constant current while the ends of the rectangular stainless steel sheet are welded together in the welding step;
    rolling a top edge of the welded stainless steel sheet and a bottom edge of the stainless steel sheet outward;
    attaching a stainless steel top cover element directly to the top edge of the welded stainless steel sheet via a first adhesive layer, closing an open top end of the welded stainless steel sheet; and
    attaching a stainless steel bottom cover element directly to the bottom edge of the welded stainless steel sheet via a second adhesive layer, closing an open bottom end of the stainless steel sheet, where the welded stainless steel sheet, stainless steel top cover element and stainless steel bottom cover element define a cavity for storage of the distilled spirits.

2. The method of making a container for distilled spirits of claim 1, wherein the welding step includes using electric resistance welding to weld the opposite longitudinal ends of the stainless steel sheet together.

3. The method of claim 1, wherein the welding step includes providing nitrogen on the opposite longitudinal ends of the stainless steel sheet while opposite longitudinal ends are being welded together.

4. A method of making a container for distilled spirits consisting of:
    providing a rectangular stainless steel sheet;
    joining opposite longitudinal ends of the rectangular stainless steel sheet together;
    welding the opposite longitudinal ends of the rectangular stainless steel sheet together, wherein the welding step includes a conversion from a first voltage to a second, lower voltage while maintaining a constant current while the ends of the rectangular stainless steel sheet are welded together in the welding step;
    rolling a top edge of the welded stainless steel sheet and an bottom edge of the stainless steel sheet outward;
    attaching a stainless steel top cover element directly to the top edge of the welded stainless steel sheet via a first adhesive layer, closing an open top end of the welded stainless steel sheet;
    attaching a stainless steel bottom cover element directly to the bottom edge of the welded stainless steel sheet via a second adhesive layer, closing an open bottom end of the stainless steel sheet, where the welded stainless steel sheet, stainless steel top cover element and stainless steel bottom cover element define a cavity for storage of the distilled spirits; and
    testing the container for leaks.

5. A method of making a container for distilled spirits consisting of:
    providing a rectangular stainless steel sheet;
    joining opposite longitudinal ends of the rectangular stainless steel sheet together;
    embossing the stainless steel sheet;
    welding the opposite longitudinal ends of the rectangular stainless steel sheet together, wherein the welding step includes a conversion from a first voltage to a second, lower voltage while maintaining a constant current while the ends of the rectangular stainless steel sheet are welded together in the welding step;
    rolling a top edge of the welded stainless steel sheet and an bottom edge of the stainless steel sheet outward;
    attaching a stainless steel top cover element directly to the top edge of the welded stainless steel sheet via a first adhesive layer, closing an open top end of the welded stainless steel sheet; and
    attaching a stainless steel bottom cover element directly to the bottom edge of the welded stainless steel sheet via a second adhesive layer, closing an open bottom end of the stainless steel sheet, where the welded stainless steel sheet, stainless steel top cover element and stainless steel bottom cover element define a cavity for storage of the distilled spirits.

6. A method of making a container for distilled spirits consisting of:
- providing a rectangular stainless steel sheet;
- joining opposite longitudinal ends of the rectangular stainless steel sheet together;
- welding the opposite longitudinal ends of the rectangular stainless steel sheet together, wherein the welding step includes a conversion from a first voltage to a second, lower voltage while maintaining a constant current while the ends of the rectangular stainless steel sheet are welded together in the welding step;
- shaping the stainless steel sheet into a rectangular shape;
- rolling a top edge of the welded stainless steel sheet and an bottom edge of the stainless steel sheet outward;
- attaching a stainless steel top cover element directly to the top edge of the welded stainless steel sheet via a first adhesive layer, closing an open top end of the welded stainless steel sheet; and
- attaching a stainless steel bottom cover element directly to the bottom edge of the welded stainless steel sheet via a second adhesive layer, closing an open bottom end of the stainless steel sheet, where the welded stainless steel sheet, stainless steel top cover element and stainless steel bottom cover element define a cavity for storage of the distilled spirits.

* * * * *